United States Patent
Altschul et al.

(10) Patent No.: US 10,694,837 B1
(45) Date of Patent: Jun. 30, 2020

(54) MAGNETICALLY CONFIGURABLE STRAP ACCESSORY FOR A MOBILE COMMUNICATIONS DEVICE

(71) Applicant: Catalyst Medium Four, Inc., Austin, TX (US)

(72) Inventors: Matthew Altschul, Austin, TX (US); Beejan Soheili, Chula Vista, CA (US)

(73) Assignee: CATALYST MEDIUM FOUR, INC., Austin, TX (US)

( * ) Notice: Subject to any disclaimer, the term of this patent is extended or adjusted under 35 U.S.C. 154(b) by 0 days.

(21) Appl. No.: 16/688,353

(22) Filed: Nov. 19, 2019

Related U.S. Application Data (63) Continuation of application No. 29/702,856, filed on Aug. 22, 2019.

(51) Int. Cl.
*A45F 5/00* (2006.01)
*A45F 5/02* (2006.01)
(Continued)

(52) U.S. Cl.
CPC .............. *A45F 5/10* (2013.01); *H04B 1/3888* (2013.01); *A45F 2200/0516* (2013.01); *A45F 2200/0525* (2013.01)

(58) Field of Classification Search
CPC ......... A45F 5/10; H04B 1/3888; H04B 1/385; B25J 15/08; B25J 15/10
(Continued)

(56) References Cited

U.S. PATENT DOCUMENTS

| 4,763,763 A * | 8/1988 | Sadow | A45C 13/26 |
| | | | 150/108 |
| 6,547,436 B2 * | 4/2003 | Sutton | A45C 3/08 |
| | | | 224/250 |

(Continued)

FOREIGN PATENT DOCUMENTS

JP   2006279907 A   10/2006

OTHER PUBLICATIONS

Amazon.com product listing for "FOURPLUSONE Cell Phone Grip, Universal Handheld Finger Strap Leap Holder," retrieved online on Aug. 22, 2019, at https://www.amazon.com/Universal-Handheld-Samsung-Smartphone-FourPlusOne/dp/B07DNTY4NQ.
(Continued)

*Primary Examiner* — Paul T Chin
(74) *Attorney, Agent, or Firm* — Scheinberg & Associates, PC; John B. Kelly (57) ABSTRACT

A magnetically configurable strap accessory for a mobile communications device and method of using the same is disclosed. The magnetically configurable strap accessory includes a strap and a base. The strap includes a first strap magnet and a second strap magnet. The base includes a first base magnet, a second base magnet, a third base magnet, and a sleeve disposed at a first end of the base into which a portion of the strap can be retracted when the accessory is in a closed position and from which a portion of the strap can be extended when the accessory is in an open position; wherein, in the closed position, the first strap magnet is positioned in proximity to the first base magnet and the second strap magnet is positioned in proximity to the third base magnet such that the strap is held in a substantially flat position against the base by way of magnetic attraction between the first strap magnet and the first base magnet and magnetic attraction between the second strap magnet and the third base magnet; and wherein, in an open position, the first
(Continued)

strap magnet is positioned in proximity to the second base magnet such that the strap is held in a substantially arched position with respect to the base by way of magnetic attraction between first strap magnet and the second base magnet thereby forming a loop between the base and the strap.

10 Claims, 9 Drawing Sheets

(51) Int. Cl.
*A45F 5/10* (2006.01)
*H04B 1/3888* (2015.01)

(58) Field of Classification Search
USPC .................................................. 294/25, 167
See application file for complete search history.

(56) References Cited

U.S. PATENT DOCUMENTS

| | | | |
|---|---|---|---|
| 6,662,986 | B2 | 12/2003 | Lehtonen |
| 8,347,657 | B2 | 1/2013 | Kim et al. |
| 8,374,657 | B2 | 2/2013 | Interdonato |
| 8,428,664 | B1 | 4/2013 | Wyers |
| 8,550,317 | B2 | 10/2013 | Hyseni |
| 8,561,862 | B2 | 10/2013 | Foggiato |
| 8,567,832 | B2 * | 10/2013 | Kannaka .................. A45F 5/00 224/218 |
| 8,600,461 | B2 | 12/2013 | Kroupa |
| 8,764,448 | B2 | 7/2014 | Yang et al. |
| 8,833,620 | B2 | 9/2014 | Interdonato |
| 8,950,638 | B2 | 2/2015 | Wangercyn, Jr. et al. |
| 9,155,377 | B2 | 10/2015 | Wangercyn, Jr. et al. |
| 9,259,077 | B2 | 2/2016 | Murphy et al. |
| 9,362,968 | B1 | 6/2016 | Haymond |
| 9,407,743 | B1 | 8/2016 | Hirshberg |
| 9,531,423 | B2 | 12/2016 | Gordon |
| 9,647,714 | B2 | 5/2017 | Hirsch |
| 10,001,243 | B2 | 6/2018 | Cavalcante |
| 10,063,272 | B1 | 8/2018 | Yeo |
| 10,128,891 | B2 | 11/2018 | Qian et al. |
| D877,154 | S * | 3/2020 | Hummel ...................... D14/447 |
| 2009/0088230 | A1 | 4/2009 | Park |
| 2012/0048873 | A1* | 3/2012 | Hyseni ...................... A45F 5/00 220/752 |
| 2012/0299318 | A1* | 11/2012 | Murphy ................... A45F 5/00 294/25 |
| 2013/0082471 | A1* | 4/2013 | Castorano ............ G06F 1/1656 294/25 |
| 2013/0240380 | A1 | 9/2013 | Hansen |
| 2014/0217135 | A1 | 8/2014 | Murphy et al. |
| 2014/0261541 | A1* | 9/2014 | Lawler ................... A01N 25/34 134/6 |
| 2017/0194999 | A1 | 7/2017 | Rothbaum |
| 2017/0328514 | A1* | 11/2017 | Cavalcante ............ H04B 1/385 |

OTHER PUBLICATIONS

Amazon.com product listing for "Speck Products GrabTab Cell Phone Holder and Stand, Works with Most Cell Phones," retrieved online on Aug. 22, 2019, at https://www.arriazon.com/Speck-Products-GrabTab-Holder-Phones/dp/B07H5LCK1T.

Speckprouets.com product listing for "GrabTab Basics Collection," retrieved online on Aug. 22, 2019, from https://www.speckproducts.com/accessories/grabtab-basics-collection/SPKGT-BSC.html.

* cited by examiner

MAGNETICALLY CONFIGURABLE STRAP ACCESSORY FOR A MOBILE COMMUNICATIONS DEVICE

The present application claims priority from U.S. Design patent application No. 29/702,856 filed on Aug. 22, 2019. The subject matter disclosed therein is incorporated by reference in its entirety into the present application.

TECHNICAL FIELD OF THE INVENTION

Embodiments of the present invention relate generally to the field of accessories for mobile communications devices and other portable electronic devices.

BACKGROUND OF THE INVENTION

Mobile communications devices are in widespread use world-wide and have become an integral part of everyday life for many people. Mobile communications devices are portable and typically handheld. Mobile communications devices are also comprised of materials and electronics that are easily broken if the device is dropped.

Mobile communications devices are used in a variety of multimedia and interactive applications, such as watching video programs and receiving and displaying notifications from software applications. When lying flat on a horizontal surface, the display of a mobile communication device can be difficult to view and interact with.

An inexpensive and interchangeable means for more securely holding a mobile communications device in the hand and for positioning the device on a surface for a better viewing angle would be an improvement in the art.

SUMMARY OF THE INVENTION

Some embodiments of the present invention are directed to a magnetically configurable strap accessory for a mobile communications device. The magnetically configurable strap accessory includes a strap and a base. The strap includes a first strap magnet and a second strap magnet. The base includes a first base magnet, a second base magnet, a third base magnet, and a sleeve disposed at a first end of the base into which a portion of the strap can be retracted when the accessory is in a closed position and from which a portion of the strap can be extended when the accessory is in an open position; wherein, in the closed position, the first strap magnet is positioned in proximity to the first base magnet and the second strap magnet is positioned in proximity to the third base magnet such that the strap is held in a substantially flat position against the base by way of magnetic attraction between the first strap magnet and the first base magnet and magnetic attraction between the second strap magnet and the third base magnet; and wherein, in an open position, the first strap magnet is positioned in proximity to the second base magnet such that the strap is held in a substantially arched position with respect to the base by way of magnetic attraction between first strap magnet and the second base magnet thereby forming a loop between the base and the strap.

Some embodiments of the present invention are directed to a method for configuring a magnetically configurable strap accessory for a mobile communications device in a closed position. The method includes providing a strap including a first strap magnet and a second strap magnet. The method includes providing a base including a first base magnet, a second base magnet, a third base magnet, and a sleeve disposed at a first end of the base into which a portion of the strap can be retracted when the accessory is in a closed position and from which a portion of the strap can be extended when the accessory is in an open position. The method includes positioning the first strap magnet in proximity to the first base magnet and the second strap magnet in proximity to the third base magnet such that the strap is held in a substantially flat position against the base by way of magnetic attraction between the first strap magnet and the first base magnet and magnetic attraction between the second strap magnet and the third base magnet.

Some embodiments of the present invention are directed to a method for configuring a magnetically configurable strap accessory for a mobile communications device in an open position. The method includes providing a strap including a first strap magnet and a second strap magnet. The method includes providing a base including a first base magnet, a second base magnet, a third base magnet, and a sleeve disposed at a first end of the base into which a portion of the strap can be retracted when the accessory is in a closed position and from which a portion of the strap can be extended when the accessory is in an open position. The method includes positioning the first strap magnet in proximity to the second base magnet such that the strap is held in a substantially arched position with respect to the base by way of magnetic attraction between first strap magnet and the second base magnet thereby forming a loop between the base and the strap.

The foregoing has outlined rather broadly the features and technical advantages of the present invention in order that the detailed description of the invention that follows may be better understood. Additional features and advantages of the invention will be described hereinafter. It should be appreciated by those skilled in the art that the conception and specific embodiments disclosed may be readily utilized as a basis for modifying or designing other structures for carrying out the same purposes of the present invention. It should also be realized by those skilled in the art that such equivalent constructions do not depart from the scope of the invention as set forth in the appended claims.

DETAILED DESCRIPTION OF EMBODIMENTS

Embodiments of the present invention are directed to a method and system for a magnetically configurable accessory for a mobile communications device. The accessory can be applied to the back of a mobile communications device or applied to the back of a case for a mobile communications device. The accessory has a retractable strap that can be pulled partially out of a sleeve at the receiving end to form a loop. The loop can be used with the user's fingers to hold the phone more securely. The loop can also be used to prop the phone up in landscape mode, for example, to watch videos. When not in use, the loop can be pressed down to retract flatly into the sleeve at the receiving end to allow for a flatter profile for the mobile phone, for example, to slide into a pocket. The accessory preferably uses magnets to hold the strap in the open and closed positions and provide a user-detectable detent that gives an enhanced feeling of fit and finish. There is a retaining band, which can comprise an elastic member, affixed to end of the strap and the sleeve in the receiving end that prevents the strap from being fully removed from the sleeve. There can also be a crease pressed into the strap where the strap and the edge of the sleeve come into contact when the strap is in the open position forming the loop. The crease, when present, helps to "lock" the strap in the correct open position.

Figure 1:
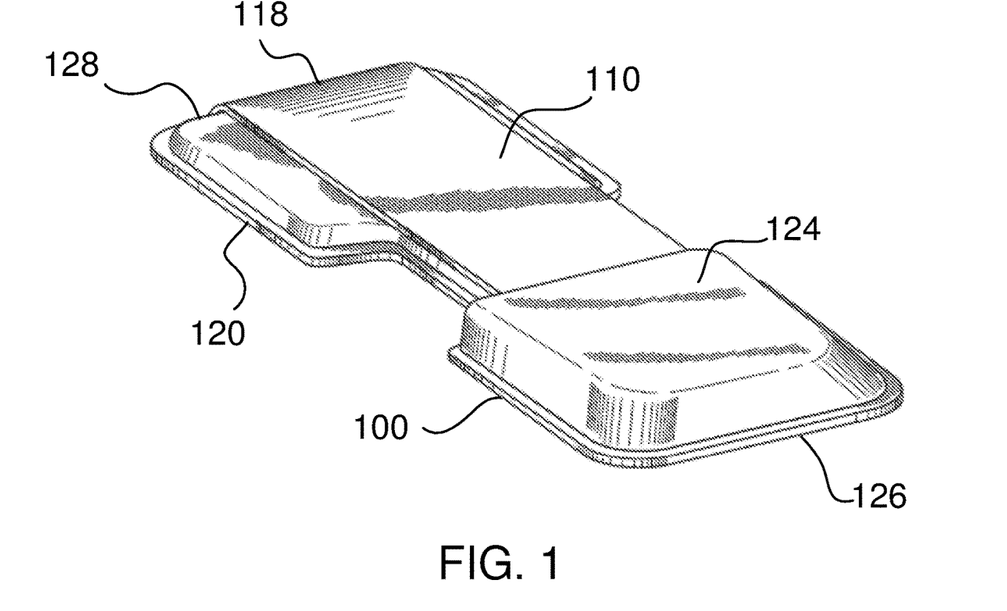
FIG. 1 is a perspective view of an exemplary embodiment of magnetically configurable mobile communications device accessory 100 shown with strap 110 in a closed position.
Figure 2:
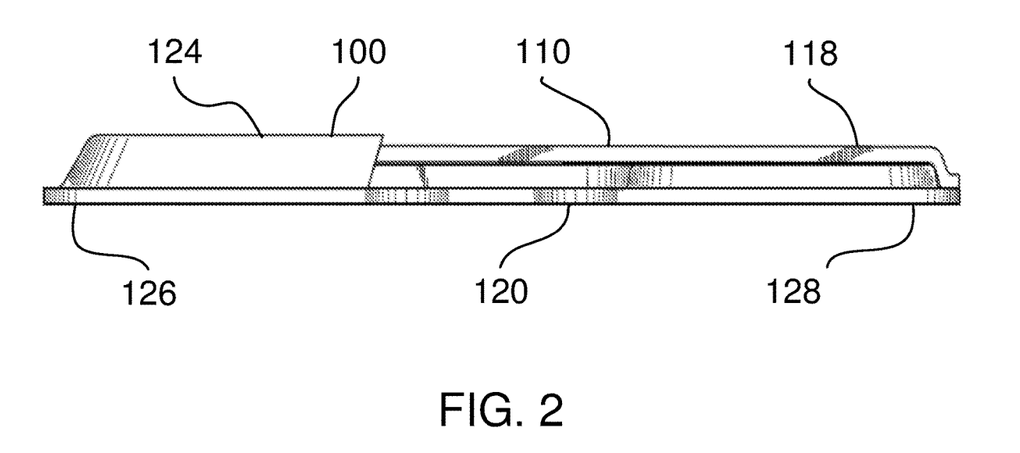
FIG. 2 is a side view of an exemplary embodiment of magnetically configurable mobile communications device accessory 100 shown with strap 110 shown in a closed position.

FIG. 1 is a perspective view of an exemplary embodiment of magnetically configurable mobile communications device accessory 100 shown with strap 110 in a closed position. FIG. 2 is side view of an exemplary embodiment of magnetically configurable mobile communications device accessory 100 shown with strap 110 shown in a closed position. Accessory 100 includes strap 110, base 120, and sleeve 124. Base 120 includes base end 126 and base end 128. Strap 100 includes strap end 116 and strap end 118. Strap end 118 is connected to base end 128 such that strap 100 can rotate, relative to base 120 about an axis formed by the connection between strap end 118 and base end 128.

In the closed position shown in FIGS. 1-2, strap 110 is disposed in a substantially flat position relative to base 120 such that the elevation of the assembly shown in FIG. 2 is preferably minimized. Magnets in strap 110 and base 120 (shown and described in further detail with respect to FIGS. 9, 11, and 14) align to hold strap 110 in the closed position. Strap end 116 is disposed within sleeve 124. Base 120 includes a sleeve 124 at base end 126. Sleeve 124 is adapted to receive strap end 116. A portion of strap 110 can be retracted into sleeve 124 when accessory 100 is in the closed position. Strap end 116 and base end 126 are connected by way of retaining band 130. Retaining band 130 is disposed within sleeve 124 and is shown and described in further detail with respect to FIGS. 9 and 11.

Figure 3:
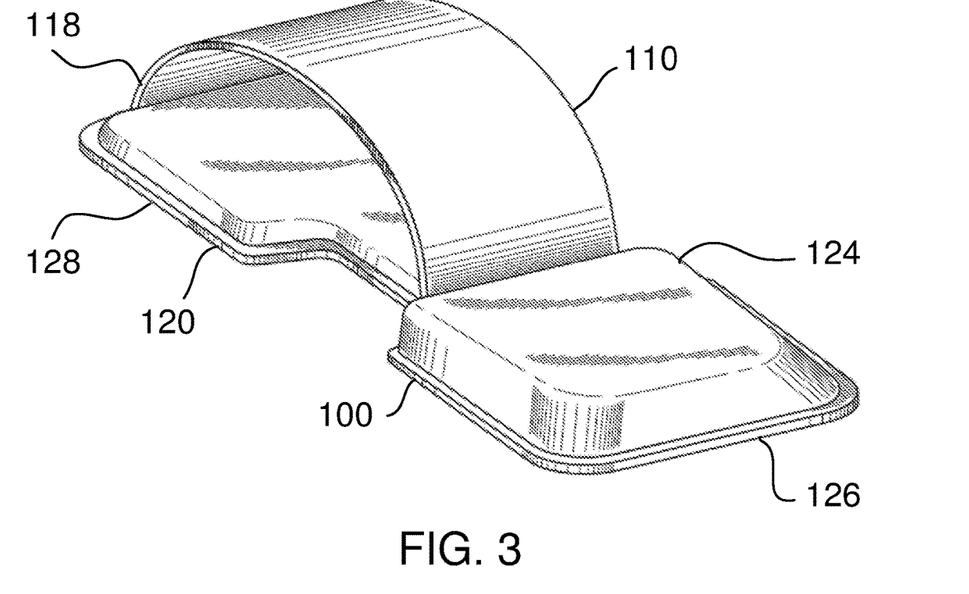
FIG. 3 is a perspective view of an exemplary embodiment of magnetically configurable mobile communications device accessory 100 shown with strap 110 in an open position.
Figure 4:
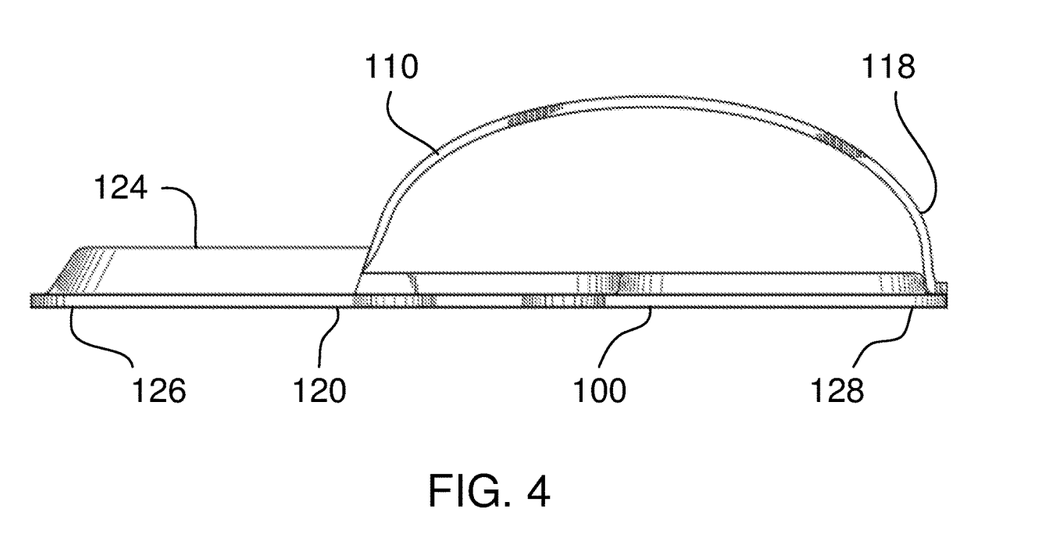
FIG. 4 is a side view of an exemplary embodiment of magnetically configurable mobile communications device accessory 100 shown with strap 110 shown in an open position.

FIG. 3 is a perspective view of an exemplary embodiment of magnetically configurable mobile communications device accessory 100 shown with strap 110 in an open position. FIG. 4 is a side view of an exemplary embodiment of magnetically configurable mobile communications device accessory 100 shown with strap 110 shown in an open position. Accessory 100 includes strap 110, base 120, and sleeve 124. Base 120 includes base end 126 and base end 128. Strap 100 includes strap end 116 and strap end 118. Strap end 118 is connected to base end 128 such that strap 100 can rotate, relative to base 120 about an axis formed by the connection between strap end 118 and base end 128.

In the open position shown in FIGS. 3-4, strap 110 is disposed in a substantially arched position relative to base 120 such that a parabolic or semi-elliptical opening is formed between strap 110 and base 120. Magnets in strap 110 and base 120 (shown and described in further detail with respect to FIGS. 9 and 11) align to hold strap 110 in the open position. Strap end 116 is disposed within sleeve 124. Base 120 includes a sleeve 124 at base end 126. Sleeve 124 is adapted to receive strap end 116. A portion of strap 110 can be extended from within sleeve 124 to place accessory 100 in the open position where a parabolic or semi-elliptical opening is formed between strap 110 and base 120. Strap end 116 and base end 126 are connected by way of retaining band 130. Retaining base 130 is disposed within sleeve 124 and is shown and described in further detail with respect to FIGS. 9 and 11. Retaining band 130 is adapted to prevent strap 100 from being completely retracted from sleeve 124.

Figure 5:
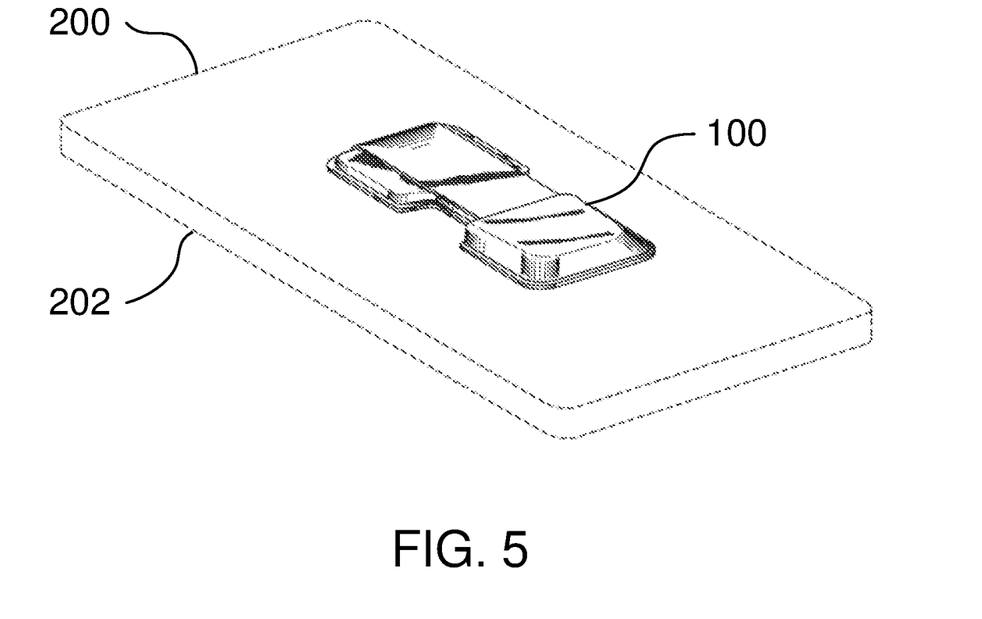
FIG. 5 is a perspective view of an exemplary embodiment of magnetically configurable mobile communications device accessory 100 disposed on mobile communications device 200 and shown with strap 110 in the closed position.

FIG. 5 is a perspective view of an exemplary embodiment of magnetically configurable mobile communications device accessory 100 disposed on mobile communications device 200 and shown with strap 110 in the closed position. Mobile communications device 200, as used herein, includes but is not limited to, a smartphone, tablet computer, and the like. Mobile communications device 200 includes a display 202, which can be a touchscreen display for input and output. Accessory 100 is preferably affixed on a surface of mobile communications device 200 that is opposite from the surface of display 202. Affixing accessory 100 on a surface of mobile communications device 200 that is opposite from the surface of display 202 enables the user to view and interact with display 202 without any obstruction from display 202. As shown in described in further detail with respect to FIG. 7, affixing accessory 100 on a surface of mobile communications device 200 that is opposite from the surface of display 202 also enables the user to "prop" mobile communications device 200 up on an edge, enabling a more suitable angle to view and interact with display 202.

In the closed position shown in FIG. 5, strap 110 is disposed in a substantially flat position relative to base 120 such that the elevation of accessory 100 above the surface to which it is affixed is preferably minimized. Minimizing the elevation of accessory 100 above the surface to which it is affixed reduces the vertical profile of the assembly of accessory 100 and mobile communications device 200, making it easier, for example, to slide the assembly into a pocket or a bag or a purse. Accessory 100 preferably includes adhesive layer 125 (not shown) on a surface of base 120. Adhesive layer 125 enables accessory 100 to be affixed to an outer surface of mobile communications device 200 or an outer surface of a protective case in which mobile communications device 200 is disposed.

Figure 6:
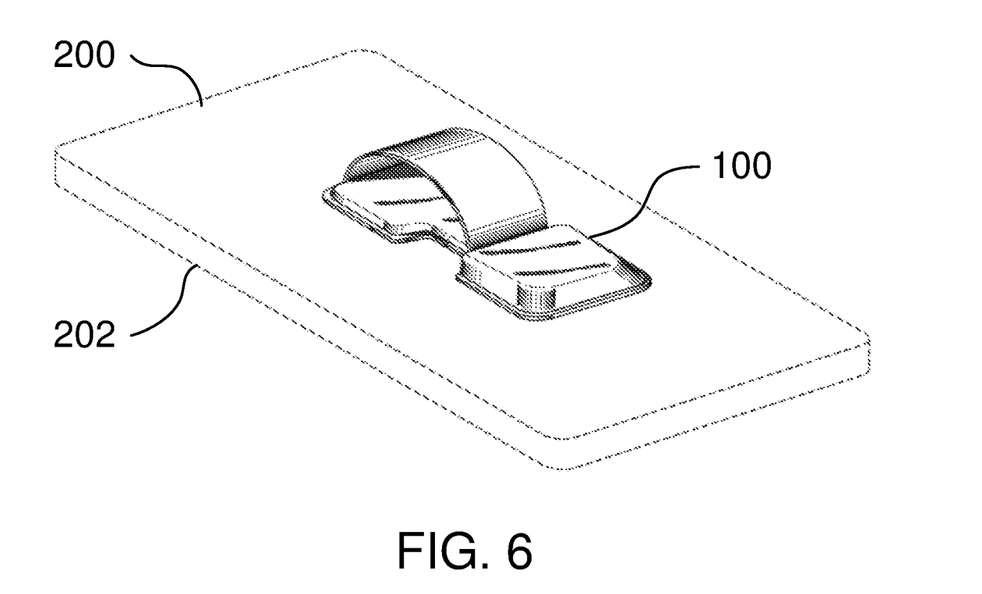
FIG. 6 is a perspective view of an exemplary embodiment of magnetically configurable mobile communications device accessory 100 disposed on mobile communications device 200 and shown with strap 110 in the open position.

FIG. 6 is a perspective view of an exemplary embodiment of magnetically configurable mobile communications device accessory 100 disposed on mobile communications device 200 and shown with strap 110 in the open position. In the open position shown in FIG. 6, strap 110 is disposed in a substantially arched position relative to base 120 such that a parabolic or semi-elliptical opening is formed between strap 110 and base 120. The opening can be used by a user to hold mobile communications device 200 more securely by placing a finger through the opening when holding the device.

Figure 7:
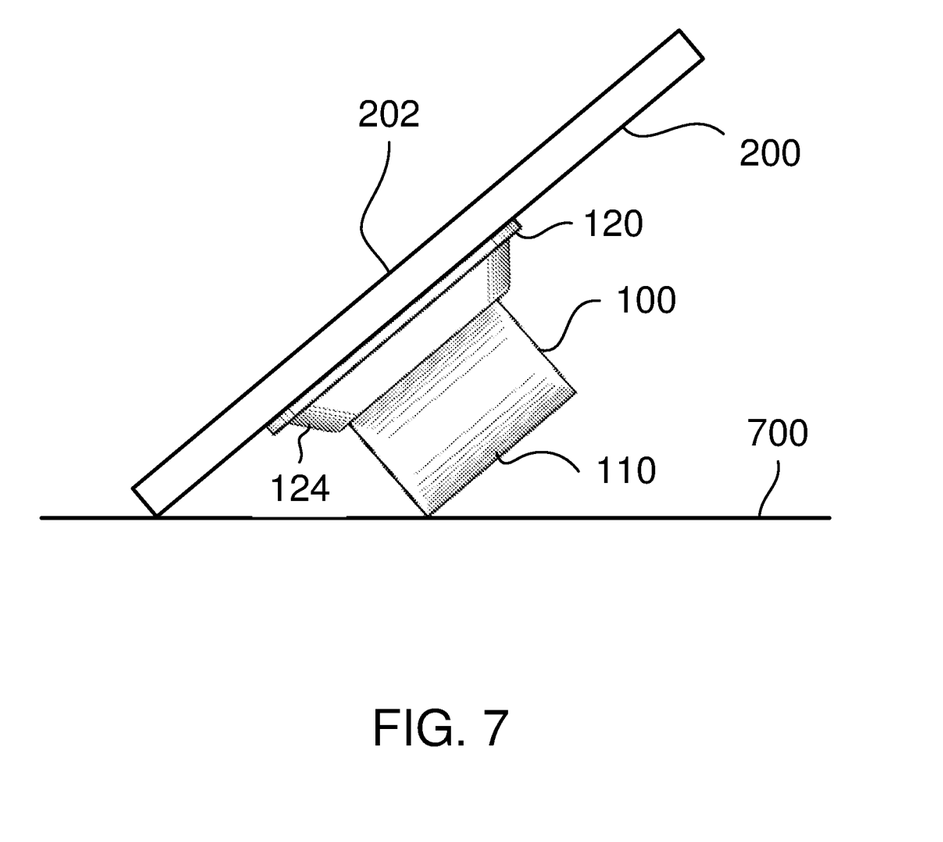
FIG. 7 is a side view of an exemplary embodiment of magnetically configurable mobile communications device accessory 100 disposed on mobile communications device 200 and shown with strap 110 in the open position.

FIG. 7 is a side view of an exemplary embodiment of magnetically configurable mobile communications device accessory 100 disposed on mobile communications device 200 and shown with strap 110 in the open position. The assembly of accessory 100 and mobile communications device 200 is oriented such that an edge of mobile communications device 200 and the arched portion of strap 110 in the open position are resting on surface 700. Such an orientation "props" mobile communications device 200 up on an edge, enabling a more suitable angle to view and interact with display 202. Surface 700 can be any surface suitable for propping up the assembly, such as a table, desk, or night stand. The "propped up" orientation enables the user to more easily watch videos and see incoming notifications and other information on display 202.

Figure 8:
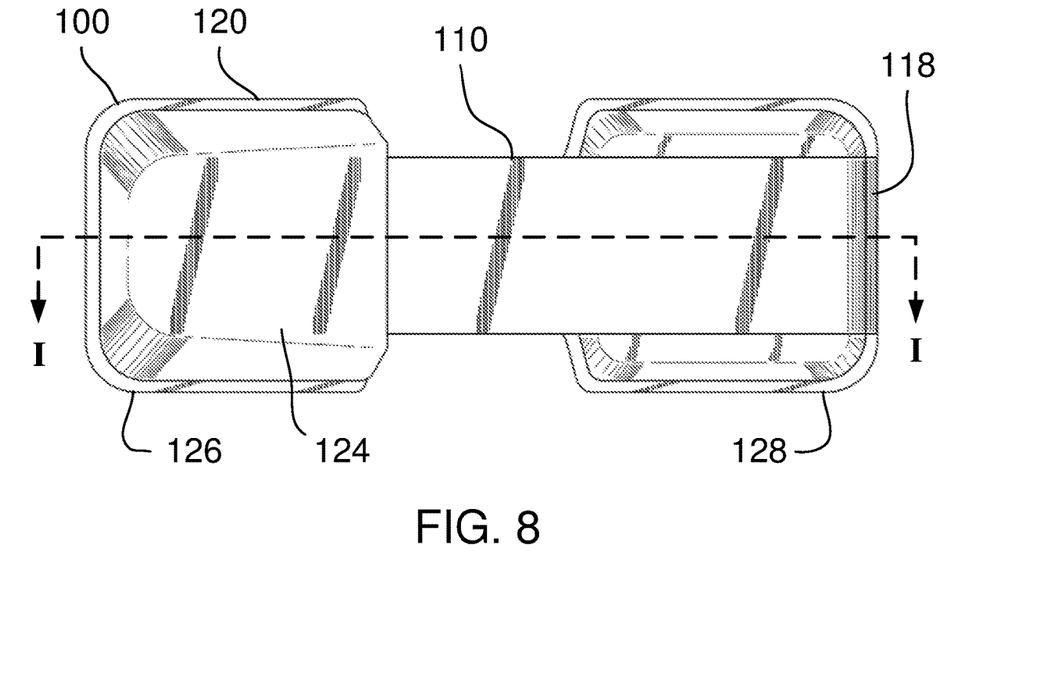
FIG. 8 is a top view of an exemplary embodiment of magnetically configurable mobile communications device accessory 100 in the closed position.
Figure 9:
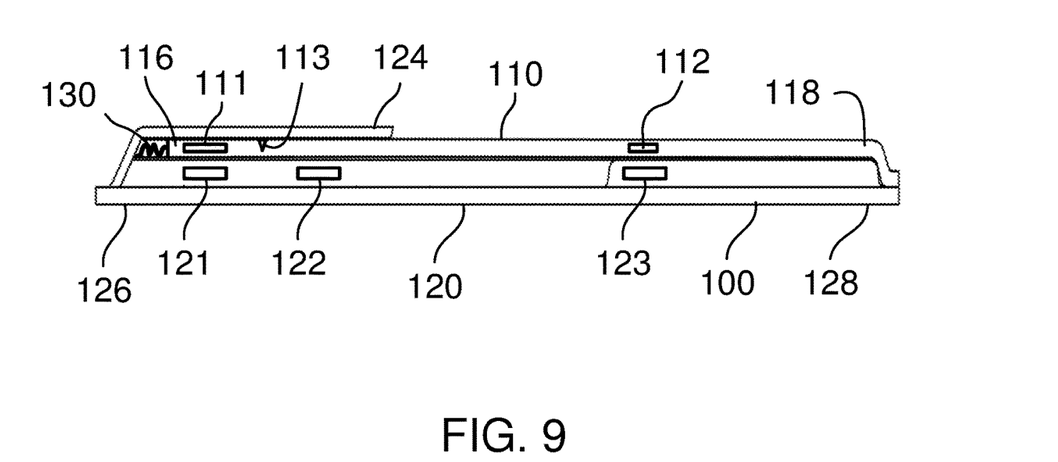
FIG. 9 is a sectional side view of exemplary embodiment of magnetically configurable mobile communications device accessory 100 as viewed through cut line I shown in FIG. 8.

FIG. 8 is a top view of an exemplary embodiment of magnetically configurable mobile communications device accessory 100 in the closed position. FIG. 9 is a sectional side view of exemplary embodiment of magnetically configurable mobile communications device accessory 100 as viewed through cut line I shown in FIG. 8. Base 120 includes base magnets 121, 122, and 123. Strap 100 includes crease 113 and strap magnets 111 and 112.

In the closed position, strap magnet 111 and base magnet 121 align by way of magnetic attraction. In the closed position, strap magnet 112 and base magnet 123 also align by way of magnetic attraction. The magnetic attraction between strap magnet 111 and base magnet 121 and the magnetic attraction between strap magnet 112 and base magnet 123 help to hold the strap in the closed position until such time as the user is ready to extend strap 110 into the open position. Additionally, when moving the strap from the open position to the closed position, the magnetic attraction between strap magnet 111 and base magnet 121 and the magnetic attraction between strap magnet 112 and base magnet 123 cause strap 110 to "snap" into the proper closed position, thereby providing a user-detectable detent that gives an enhanced feeling of fit and finish. In the closed position, retaining band 130 is compressed by strap end 116 and bunches up to be fully contained within the portion sleeve 124 that is not occupied by strap 110.

Figure 10:
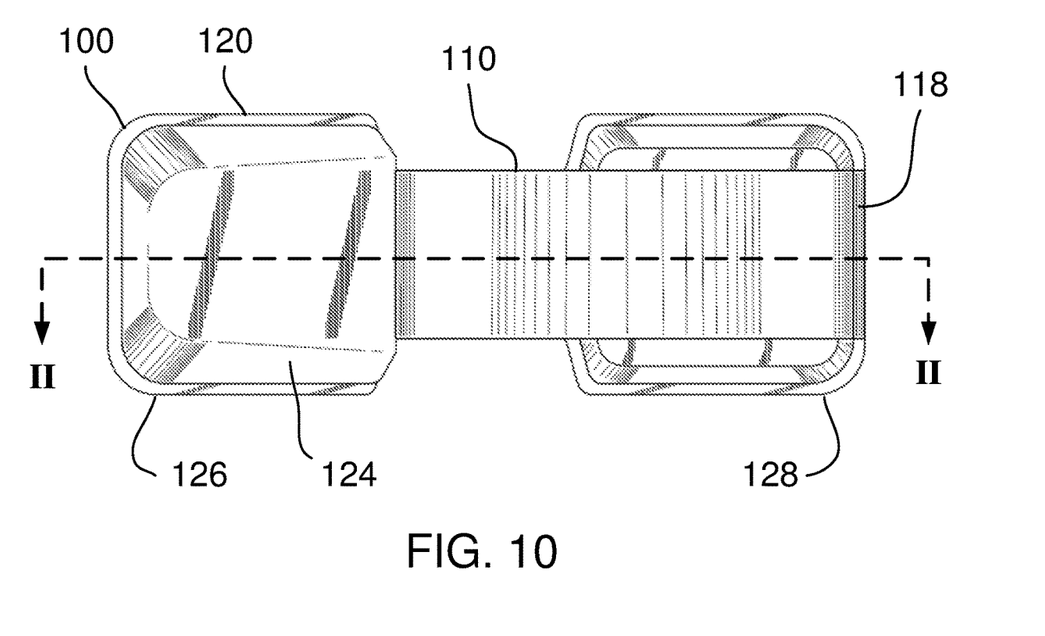
FIG. 10 is a top view of an exemplary embodiment of magnetically configurable mobile communications device accessory 100 in the open position.
Figure 11:
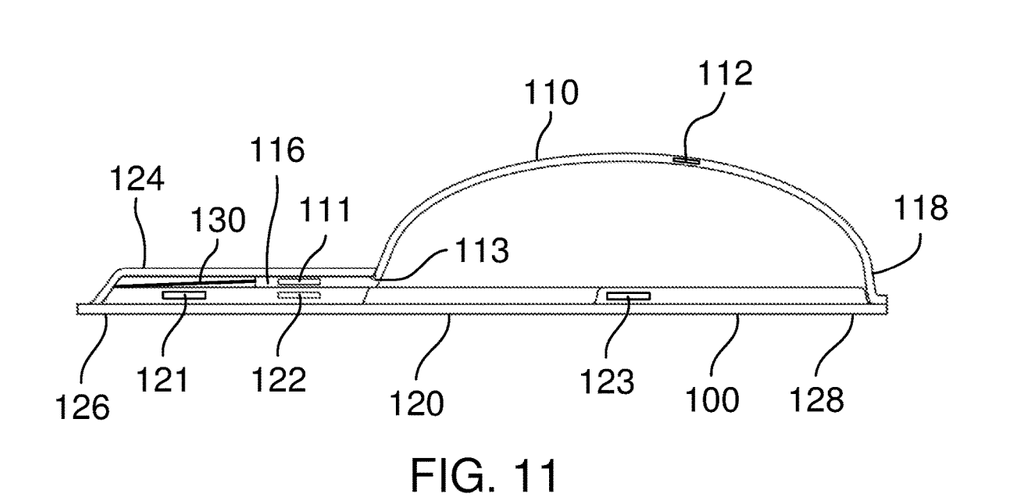
FIG. 11 is a sectional side view of exemplary embodiment of magnetically configurable mobile communications device accessory 100 as viewed through cut line II shown in FIG. 10.

FIG. 10 is a top view of an exemplary embodiment of magnetically configurable mobile communications device accessory 100 in the open position. FIG. 11 is a sectional side view of exemplary embodiment of magnetically configurable mobile communications device accessory 100 as viewed through cut line II shown in FIG. 10.

In the open position, strap magnet 111 and base magnet 122 align by way of magnetic attraction. The magnetic attraction between strap magnet 111 and base magnet 122 helps to hold the strap in the closed position until such time as the user is ready to retract strap 110 into the closed position. Additionally, when moving the strap from the closed position to the open position, the magnetic attraction between strap magnet 111 and base magnet 122 causes strap 110 to "snap" into the proper closed position, thereby providing a user-detectable detent that gives an enhanced feeling of fit and finish. In the open position, retaining band 130 is stretched as strap end 116 is retracted from sleeve 124. Retaining band 130 prevents strap end 116 from being fully retracted from sleeve 124. Crease 113 is pressed into strap 100 and enables strap 100 to bend at the location of crease 113. In the open position, crease 113 forms a demarcation between the arched portion of strap 110 that is retracted from sleeve 124 and the portion of strap 110 that remains flat and disposed within sleeve 124. Crease 113 also provides a small slot into which the edge of sleeve 124 is held when strap 110 is in the open position, thereby assisting strap magnet 111 and base magnet 122 in holding strap 110 in the open position.

Figure 12:
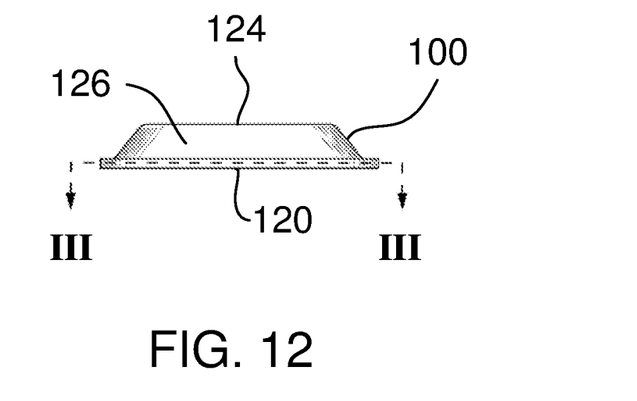
FIG. 12 is an end view of an exemplary embodiment of magnetically configurable mobile communications device accessory 100 in the closed position.
Figure 13:
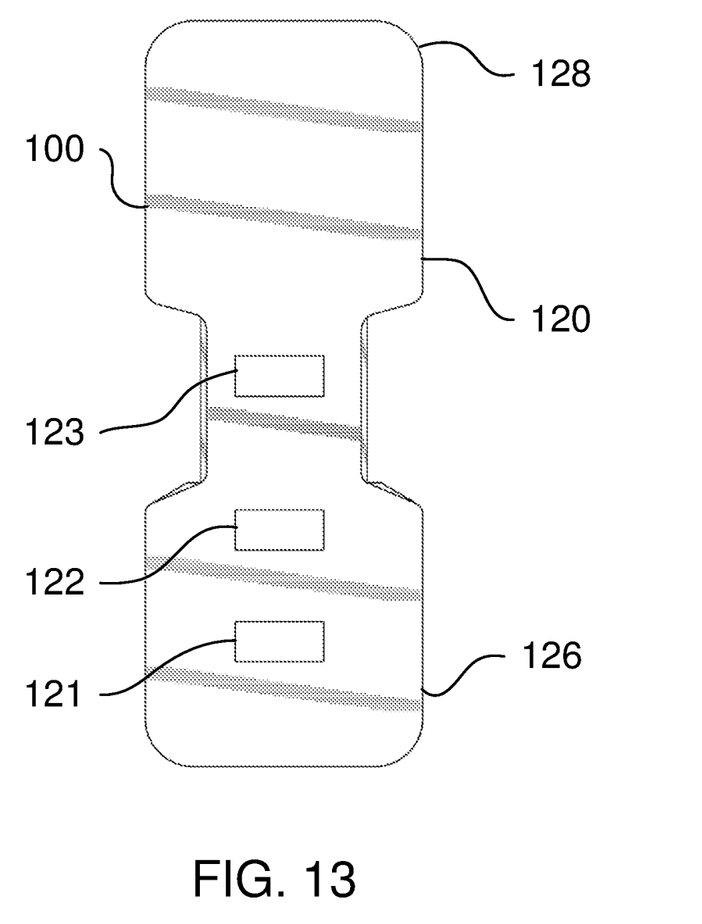
FIG. 13 is a sectional top view of exemplary embodiment of magnetically configurable mobile communications device accessory 100 as viewed through cut line III shown in FIG. 12.

FIG. 12 is an end view of an exemplary embodiment of magnetically configurable mobile communications device accessory 100 in the closed position. FIG. 13 is a sectional top view of exemplary embodiment of magnetically configurable mobile communications device accessory 100 as viewed through cut line III shown in FIG. 12.

Figure 14:
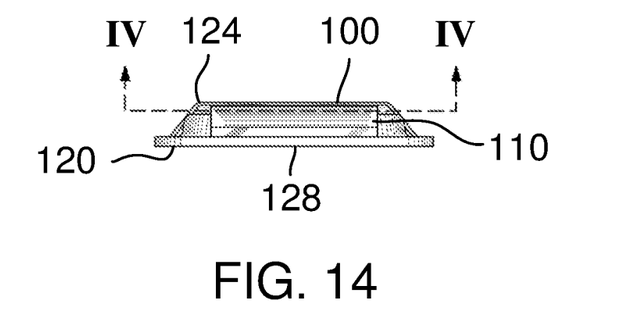
FIG. 14 is an end view of an exemplary embodiment of magnetically configurable mobile communications device accessory 100 in the closed position, the end being opposite of the end shown in FIG. 12.
Figure 15:
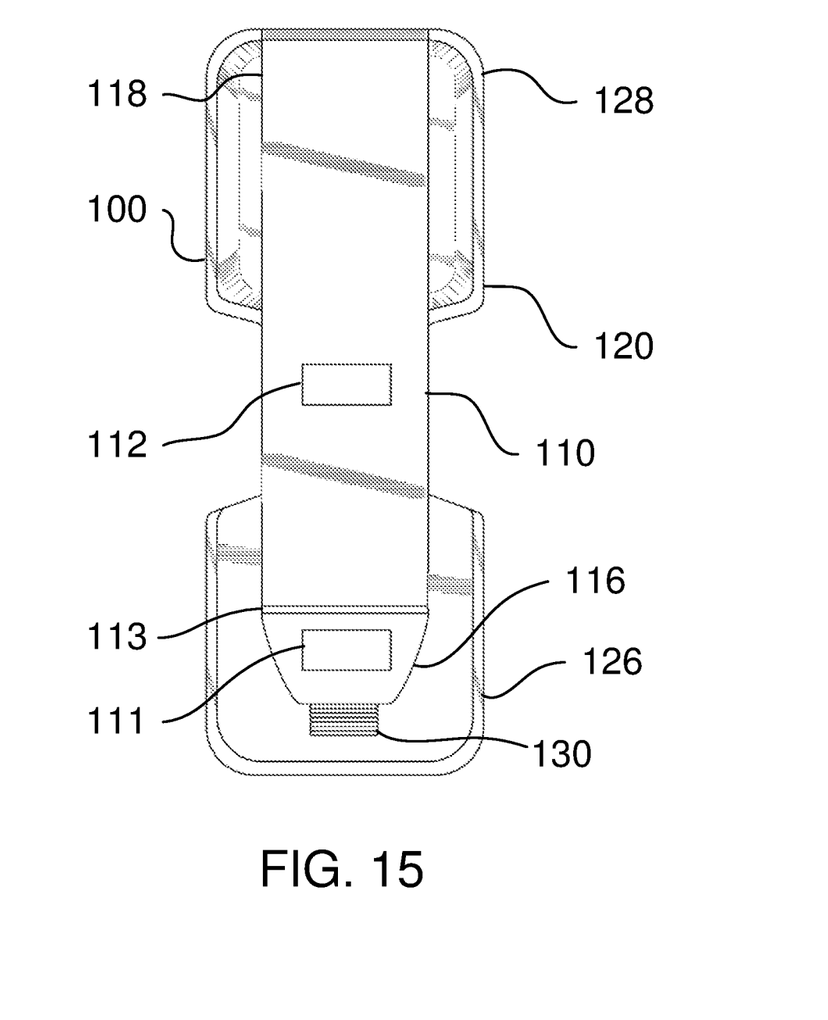
FIG. 15 is a sectional top view of exemplary embodiment of magnetically configurable mobile communications device accessory 100 as viewed through cut line IV shown in FIG. 12.

FIG. 14 is an end view of an exemplary embodiment of magnetically configurable mobile communications device accessory 100 in the closed position, the end being opposite of the end shown in FIG. 12. FIG. 15 is a sectional top view of exemplary embodiment of magnetically configurable mobile communications device accessory 100 as viewed through cut line IV shown in FIG. 12.

Figure 16:
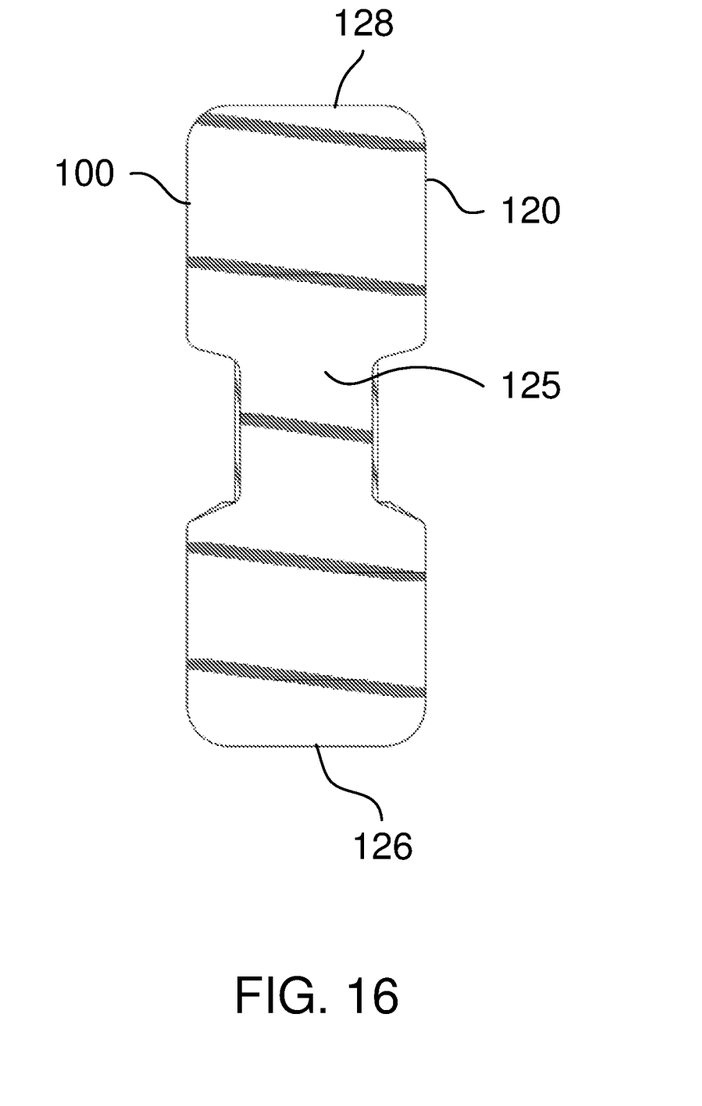
FIG. 16 is left-side elevation view of the present design in the second configuration.

FIG. 16 is a bottom view of an exemplary embodiment of magnetically configurable mobile communications device accessory 100. The bottom of accessory 100 preferably includes adhesive layer 125 for affixing accessory 100 to an outer surface of mobile communications device 200 or an outer surface of a protective case in which mobile communications device 200 is disposed. Adhesive layer 125 can include a removable cover to preserve the adhesive until such time as the user is ready to affix accessory 100 to the mobile communications device 200 or the protective case in which mobile communications device 200 is disposed.

Although the present invention and its advantages have been described in detail, it should be understood that various changes, substitutions and alterations can be made herein without departing from the scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

We claim as follows:

1. A magnetically configurable strap accessory for a mobile communications device comprising:
   a strap including:
     a first strap magnet;
     a second strap magnet;
   a base including:
     a first base magnet;
     a second base magnet;
     a third base magnet;
     a sleeve disposed at a first end of the base into which a portion of the strap can be retracted when the accessory is in a closed position and from which a portion of the strap can be extended when the accessory is in an open position;
   wherein, in the closed position, the first strap magnet is positioned in proximity to the first base magnet and the second strap magnet is positioned in proximity to the third base magnet such that the strap is held in a substantially flat position against the base by way of magnetic attraction between the first strap magnet and the first base magnet and magnetic attraction between the second strap magnet and the third base magnet; and
   wherein, in an open position, the first strap magnet is positioned in proximity to the second base magnet such that the strap is held in a substantially arched position with respect to the base by way of magnetic attraction between first strap magnet and the second base magnet thereby forming a loop between the base and the strap.

2. The accessory of claim 1 further comprising a retaining band disposed within the sleeve, a first end of the retaining band connected to a first end of the strap, a second end of the retaining band connected to the first end of the base.

3. The accessory of claim 2 wherein the retaining band is adapted so that tension in the retaining band assists with moving the strap from the open position to the closed position.

4. The accessory of claim 2 wherein the retaining band is comprised of an elastic material.

5. The accessory of claim 2 wherein the retaining band is adapted to prevent the strap from being completely retracted from the sleeve.

6. The accessory of claim 2 wherein the retaining band is disposed entirely within the sleeve when the accessory is in the closed position.

7. The accessory of claim 1 in which the strap further includes a crease, the crease enabling the strap to bend at a location of the crease.

8. The accessory of claim 1 in which the base further includes an adhesive adapted for affixing the accessory to the mobile communications device or a protective case within which the mobile communications device is disposed.

9. A method for configuring a magnetically configurable strap accessory for a mobile communications device in a closed position, the method comprising:
   providing a strap including:
     a first strap magnet;
     a second strap magnet;
   providing a base including:
     a first base magnet;
     a second base magnet;
     a third base magnet;
     a sleeve disposed at a first end of the base into which a portion of the strap can be retracted when the accessory is in a closed position and from which a portion of the strap can be extended when the accessory is in an open position; and
   positioning the first strap magnet in proximity to the first base magnet and the second strap magnet in proximity to the third base magnet such that the strap is held in a substantially flat position against the base by way of magnetic attraction between the first strap magnet and the first base magnet and magnetic attraction between the second strap magnet and the third base magnet.

10. A method for configuring a magnetically configurable strap accessory for a mobile communications device in an open position, the method comprising:
   providing a strap including:
     a first strap magnet;
     a second strap magnet;
   providing a base including:
     a first base magnet;
     a second base magnet;
     a third base magnet;
     a sleeve disposed at a first end of the base into which a portion of the strap can be retracted when the accessory is in a closed position and from which a portion of the strap can be extended when the accessory is in an open position; and
   positioning the first strap magnet in proximity to the second base magnet such that the strap is held in a substantially arched position with respect to the base by way of magnetic attraction between first strap magnet and the second base magnet thereby forming a loop between the base and the strap.

* * * * *